Patented Dec. 30, 1924.

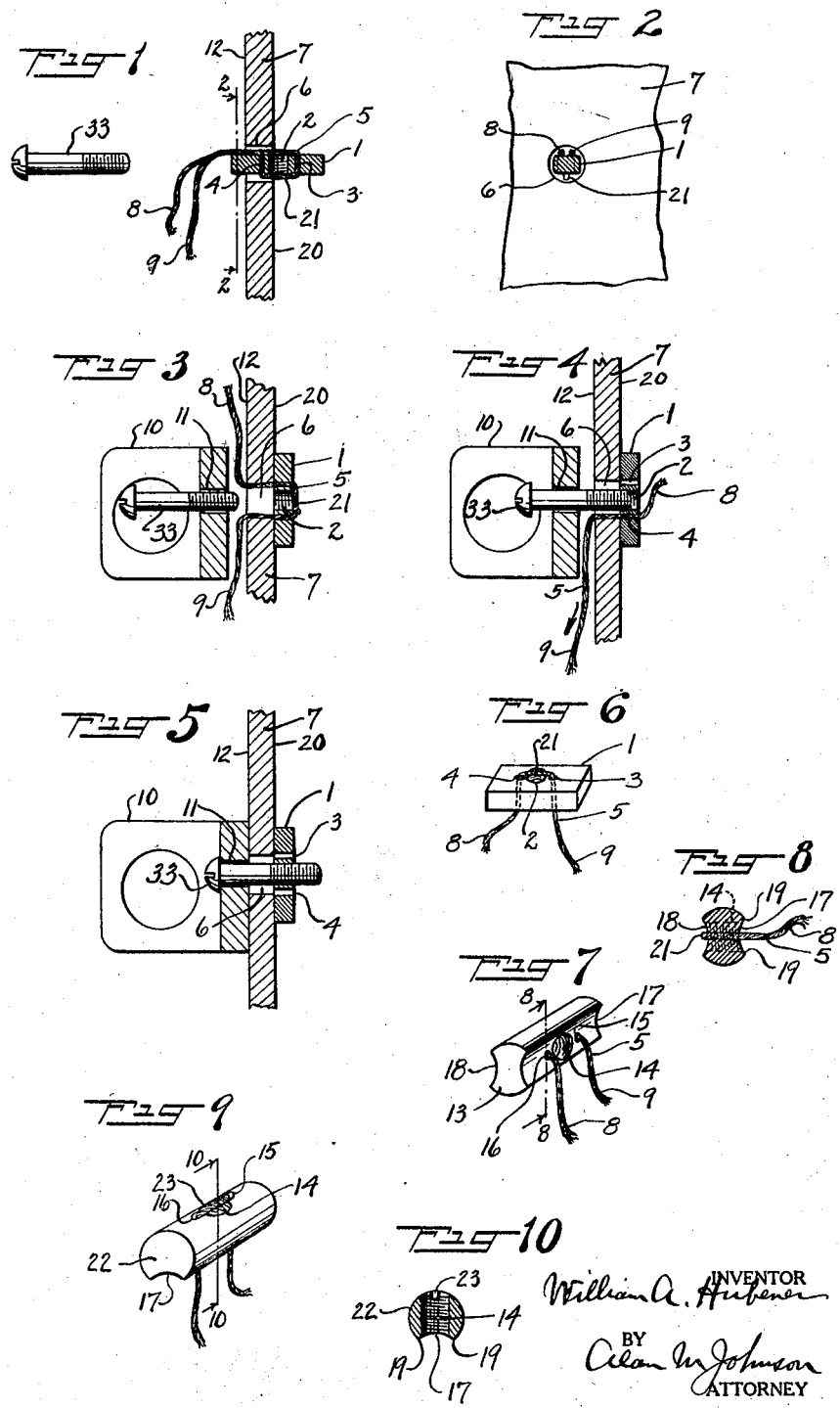

1,521,024

UNITED STATES PATENT OFFICE.

WILLIAM A. HUBENER, OF NEW YORK, N. Y., ASSIGNOR TO DIAMOND EXPANSION BOLT COMPANY, OF NEW YORK, N. Y., A CORPORATION OF NEW YORK.

ANCHOR-BOLT NUT.

Application filed August 8, 1923. Serial No. 656,324.

*To all whom it may concern:*

Be it known that I, WILLIAM A. HUBENER, a citizen of the United States, residing at New York, in the county and State of New York, have made certain new and useful Improvements in Anchor-Bolt Nuts, of which the following is a specification, taken in connection with the accompanying drawings.

My invention relates to anchor bolt nuts, or toggles, which can be used for general application to support an object on a wall or other support, where it is impossible for the nut to be applied directly to a bolt from the inside of the wall because of inaccessibility.

My invention further relates to anchor bolt nuts, or toggles, provided with a removable pull member which is employed to position the nut on the inside of the wall, and, after the bolt engages the nut, is removed from the nut and discarded. This permits the work to be brought up flush against the outside of the wall, and avoids the formation of a crevice or crack between the work and the wall, which would collect dust and reduce the bearing surface of the work upon the wall or other support.

My invention further relates to certain combinations, details of construction, and articles of manufacture, which will be more fully hereinafter described and pointed out in the claims.

In the accompanying drawings, the same reference numerals refer to similar parts in the several figures:—

Fig. 1 is a horizontal section through a wall and anchor bolt nut, showing the first position of inserting the nut, the bolt being shown in plan;

Fig. 2 is a vertical section on line 2—2 of Fig. 1;

Fig. 3 is a horizontal section, showing the anchor bolt nut held in position by the removable pull member;

Fig. 4 is a horizontal section, similar to Fig. 3, with the bolt engaging the anchor bolt nut, and the removable pull member partly withdrawn from the nut;

Fig. 5 is a horizontal section showing the final position of the parts, the removable pull member being entirely withdrawn;

Fig. 6 is a perspective view of the anchor bolt nut shown in Figs. 1, 2, 3, 4 and 5;

Fig. 7 is a perspective view of a modified form of anchor bolt nut;

Fig. 8 is a vertical section on line 8—8 of Fig. 7;

Fig. 9 is a perspective view of another modified form of anchor bolt nut;

Fig. 10 is a vertical section on line 10—10 of Fig. 9.

My invention is adapted for universal application wherever it is impossible, or inconvenient, to gain access to the rear of a wall, or other suitable support, to apply a nut to a bolt to support any form of work on the wall. It is particularly adapted to be used to support objects or work, of any kind, to walls formed of terra-cotta, brick or any other material.

In drilling holes in such walls, it is essential that they be as small as possible, both for economy in drilling them, and also to avoid marring or weakening the wall.

In my invention the hole is but little larger than the size of the bolt to be used.

To prevent the anchor bolt nut from being lost on the rear of the wall, and to permit it to be manipulated on the inner inaccesible surface of the wall and brought into position to be engaged by the bolt, I removably secure to the anchor bolt nut a removable pull member, which can be removed after it has accomplished its purpose, and before the bolt is screwed home in the anchor nut.

I am aware that an anchor bolt nut provided with elongated strips of ductile metal, as of wire or sheet brass permanently secured to the nut has been patented. This form besides being expensive to manufacture is objectionable in that the strips of ductile metal being permanently secured to the nut extend out of the hole and lie against the outer face of the wall. It is, therefore, impossible to bring the work up flush against the outer surface of the wall, the work being held from the wall by the strip of ductile metal or wire. The distance that the work is held from the wall, will, of course, vary with the thickness of the wire or metal strip. There will, at all times, be a crack or crevice between the work and the wall to catch dirt, and, if the anchor bolt is used, in some locations, form a breeding place for vermin. Besides the bearing surface between the work and wall is reduced.

By my invention I eliminate this objection by having my pull member removable from the anchor bolt nut so that, after it has performed its function, it can be withdrawn and discarded permitting the work to be brought up flush against the outer surface of the wall, making a neater, better, and more sanitary fastening.

I have shown in the drawings three different forms of anchor bolt nut, but, of course, these are merely illustrative of my invention, which is not to be limited to these particular forms, shown by way of example.

In Figs. 1 to 6, inclusive, I have shown one form of anchor bolt nut 1, having a tapped hole 2 to cooperate with the bolt 33. The anchor bolt 1 is also provided with any suitable means to removably hold a pull member. One such means that I have shown in the drawings consists of the two holes 3, 4 through which the pull member 5 is threaded. This pull member may be of any suitable construction to removably engage the anchor bolt nut 1. In practice I preferably form it of cord, which will be frictionally, but removably, held in the holes 3 and 4. The friction is sufficient to prevent the pull member 5 being accidentally disconnected from the nut 1 in shipping or handling. It is understood that these anchor bolt nuts, equipped with the pull members, will be sold as separate articles of manufacture.

A hole 6 of minimum diameter and but little larger than the diameter of the bolt 33 is drilled, or otherwise formed, in the wall 7. To insert the anchor bolt nut 1 within the hole 6, either or both ends 8 and 9 of the pull member 6 are held while the nut 1 is forced into said hole 6, Fig. 1. As soon as the anchor bolt nut 1 clears the wall 7, it can be manipulated to bridge the hole 6 by operating the ends 8 and 9 of the pull member, getting the nut into the position shown in Fig. 3.

The work, as for example, a bracket 10 provided with a hole for the reception of the bolt 33, is then brought into the position shown in Fig. 3. The bolt 33 is then caused to engage the female threads in the hole 2 of the anchor bolt, Fig. 4. As soon as sufficient of the threads on the bolt nut are engaged to hold the nut, the pull member 5 is withdrawn by pulling hard on one of the ends, as for example 9, Fig. 4. With the removal of the pull member 5, the bolt 3 is screwed home in the anchor bolt nut 1, bringing the work 10 up flush against the outer face 12 of the wall 7, without forming a crack or crevice between the work and wall.

I have shown a modification of my anchor bolt nut in Figs. 7 and 8. In these figures the nut 13 is formed cylindrical with a tapped hole 14 for the reception of the bolt 3. The nut is also provided with two holes 15 and 16 to frictionally, but removably, hold the pull member 5, having the ends 8 and 9. I also preferably provide the nut with two longitudinally extending grooves 17 and 18 arranged on opposite sides of the nut. The groove 17, where it meets the exterior surface of the cylindrical nut forms teeth 19, 19 which serve to bite into, or engage with, the inner surface 20 of the wall or other suitable support 7. By providing the second groove 18 the loop 21 of the pull member is received therein and protected as the nut 13 is forced into the hole 6 in the wall. By this arrangement the hole 6 need be of no greater diameter than that necessary to snugly receive the cylindrical nut 13.

The operation of this bolt anchor nut 13, with its removable pull member 5, is the same as that previously described.

I have shown another modification in Figs. 9 and 10. In this form the bolt anchor nut 22 is provided with the longitudinally extending groove 17, forming teeth 19, 19; with a tapped hole 14; and with two holes 15 and 16, the same as in Figs. 7 and 8. Instead of forming a long longitudinal groove, as 18 in Fig. 7, in this form, I provide a short groove 23, Figs. 9 and 10, to receive the portion 21 of the removable pull member 5, which in all forms is preferably a cord or similar member. The operation of this form is the same as the operation of the other forms previously described.

Having thus described this invention in connection with illustrative embodiments thereof, to the details of which I do not desire to be limited, what is claimed as new and what is desired to secure by Letters Patent is set forth in the appended claims.

What I claim is:—

1. The combination of a wall having a hole, work to be supported upon the wall, an anchor bolt nut having a removable pull member to position the nut on the interior of the wall, a securing member cooperating with the anchor bolt nut, said pull member being adapted to be removed from the nut prior to the final positioning of the parts so that the work can be brought up flush against the outer face of the wall.

2. A new article of manufacture comprising an anchor bolt nut having a transverse threaded hole to engage with a bolt, and provided with a plurality of holes parallel to the longitudinal axis of the anchor bolt nut, to permit ready removal of a pull member, and a removable pull member.

3. The combination of a wall having a hole and an anchor bolt nut having a transverse threaded hole to engage with a bolt, and provided with a plurality of holes adjacent the threaded hole and adapted to register with the hole in a wall or other support to permit ready removal of a pull member, and a removable pull member.

WILLIAM A. HUBENER.

Witnesses:
MARIE C. EICHENBERGER,
DANIEL J. CURDE, Jr.